US008341738B2

(12) United States Patent
Fazunenko et al.

(10) Patent No.: US 8,341,738 B2
(45) Date of Patent: Dec. 25, 2012

(54) API SIGNATURE VERIFICATION FOR HIGH-SECURITY PLATFORMS

(75) Inventors: Dmitry A. Fazunenko, St. Petersburg (RU); Mikhail K. Ershov, St. Petersburg (RU)

(73) Assignee: Oracle America, Inc., Redwood City, CA (US)

( * ) Notice: Subject to any disclaimer, the term of this patent is extended or adjusted under 35 U.S.C. 154(b) by 588 days.

(21) Appl. No.: 12/569,436

(22) Filed: Sep. 29, 2009

(65) Prior Publication Data

US 2011/0078790 A1    Mar. 31, 2011

(51) Int. Cl.
G06F 11/00    (2006.01)
(52) U.S. Cl. .......................................... 726/22; 726/25
(58) Field of Classification Search .............. 726/22, 726/25, 23, 24; 717/124, 126, 127, 131; 719/328
See application file for complete search history.

(56) References Cited

U.S. PATENT DOCUMENTS

| | | |
|---|---|---|
| 6,983,399 B2 | 1/2006 | Dochez et al. |
| 2008/0134156 A1 | 6/2008 | Osminer et al. |

OTHER PUBLICATIONS

"Japitools: Java API compatibility testing tools," Copyright 2000-2006, found at http://sab39.netreach.com/Software/Japitools/42/, pp. 1-28.
"OS Java," Last published: Feb. 20, 2006/Doc for v0.Osjava, found at http://www.osjava.org/jardiff/, pp. 1-10.
"Java API Signature verification," Jour, Last Published: Dec. 12, 2008, found at http://jour.sourceforge.net/signature.html, pp. 1-13.
Sun Microsystems, Inc., "SigTest Tool 2.0 User's Guide: for Java™ Compatibility Test Suite Developers," Apr. 2008, pp. 1-58.
U.S. Appl. No. 11/180,819, filed Jul. 13, 2005.

*Primary Examiner* — Kim Vu
*Assistant Examiner* — Baotran N To
(74) *Attorney, Agent, or Firm* — Robert C. Kowert; Meyertons, Hood, Kivlin, Kowert & Goetzel, P.C.

(57) ABSTRACT

A system and method is disclosed for verifying whether a test API of a high-security software platform implements a reference API when a verification tool has insufficient permissions to detect one or more members of the test API. A signature is determined for a reference API implementation, which includes multiple API members. Determining the signature involves identifying a proper subset of the API members, where the subset excludes one or more API members that are not programmatically detectable by a given verification tool executing on a high-security platform that implements the reference API. The member may not be detectable by the verification tool because the tool has insufficient permission to programmatically detect the member on the high-security platform. The signature is then configured to indicate the members of the subset and not the excluded members. The signature is then stored.

20 Claims, 5 Drawing Sheets

API SIGNATURE VERIFICATION FOR HIGH-SECURITY PLATFORMS

BACKGROUND

Many modern software systems are built on standard, third-party software platforms, such as Java. Such platforms provide standard and frequently used functionality, which a given application may access through a programmatic interface (API). For example, the Java software platform includes a variety of classes, methods, and utilities including a runtime environment and frequently used functions and data structures for quickly developing and deploying applications.

Often times, different parties each implement their own version of a given platform. For example, BlueRay™ video players are often produced and loaded with a custom version of a given software platform, such as a custom Java platform. In order to ensure that software applications written to execute on a given platform interoperate properly with versions of the platform written by different parties, it is sometimes desirable to verify that a given platform implementation (test API) exposes at least a minimum set of functionality, as defined by a reference API. Such checking may be referred to as API verification.

The minimum functionality of a given platform may be defined by a specification or reference implementation of the platform. A variety of products is available for determining the conformance of a test API exposed by one platform with a reference API. These include both commercially and freely available products, such as the SigTest tool, which verifies that a given Java platform implementation includes a reference API. Such tools may include a setup step wherein a reference API is defined (e.g., in a reference signature file) and a test phase, wherein a verification tool is executed on a platform under test and, using the reference signature file, determines whether the API exposed by the platform under test (test API) conforms to the given reference API.

To perform the test phase, verification tools, such as SigTest, may use various utilities (e.g., Java Reflection) to discover the members that constitute the API under test. However, if the platform under test comprises a high-security platform, traditional verification tools may not have sufficient permissions to discover all members of the test API, and may therefore fail. For example, during the test phase, the SigTest tool relies on reflection methods such as getDeclared Classes( ), getDeclaredConstructors( ), getDeclaredFields( ), and getDeclaredMethods( ) for discovering the test API. However, in high-security platforms, such methods may require a higher level of permissions than is granted to the SigTest application. Therefore, SigTest and similar tools traditionally fail when attempting to verify whether high-security platforms, such as Java™ high-security sandbox platforms, conform to a given reference API.

SUMMARY

A system and method is disclosed for verifying whether a test API of a high-security software platform (e.g., a high-security sandbox Java™ platform) implements a reference API when a verification tool has insufficient permissions to detect one or more members of the test API. A signature is determined for a reference API implementation, which includes multiple API members. Determining the signature involves identifying a proper subset of the API members, where the subset excludes one or more API members that are not programmatically detectable by a given verification tool executing on a high-security platform that implements the reference API. The member may not be detectable by the verification tool because the tool has insufficient permission to programmatically detect the member on the high-security platform. The signature is then configured to indicate the members of the subset and not the excluded members. The signature is then stored, such as in a file.

After this initial phase, the method may further comprise executing the API verification tool on a high-security platform that implements a test API that includes a number of test API members. The API verification tool may have insufficient permissions to programmatically detect at least one of the plurality of test API members. Executing the tool may involve scanning the test API to determine a subset of the test API members, where the subset excludes any of the test API members that the API verification tool has insufficient permissions to programmatically detect.

In some embodiments, the method may further include determining a partial signature for the test API, where the partial signature identifies the test API members in the subset and excludes any test API members not in the subset. The tool may then verify whether the subset of test API members contains the members of the subset of reference API members, such as by comparing the signature of the reference API with that of the test API.

Figure 1:
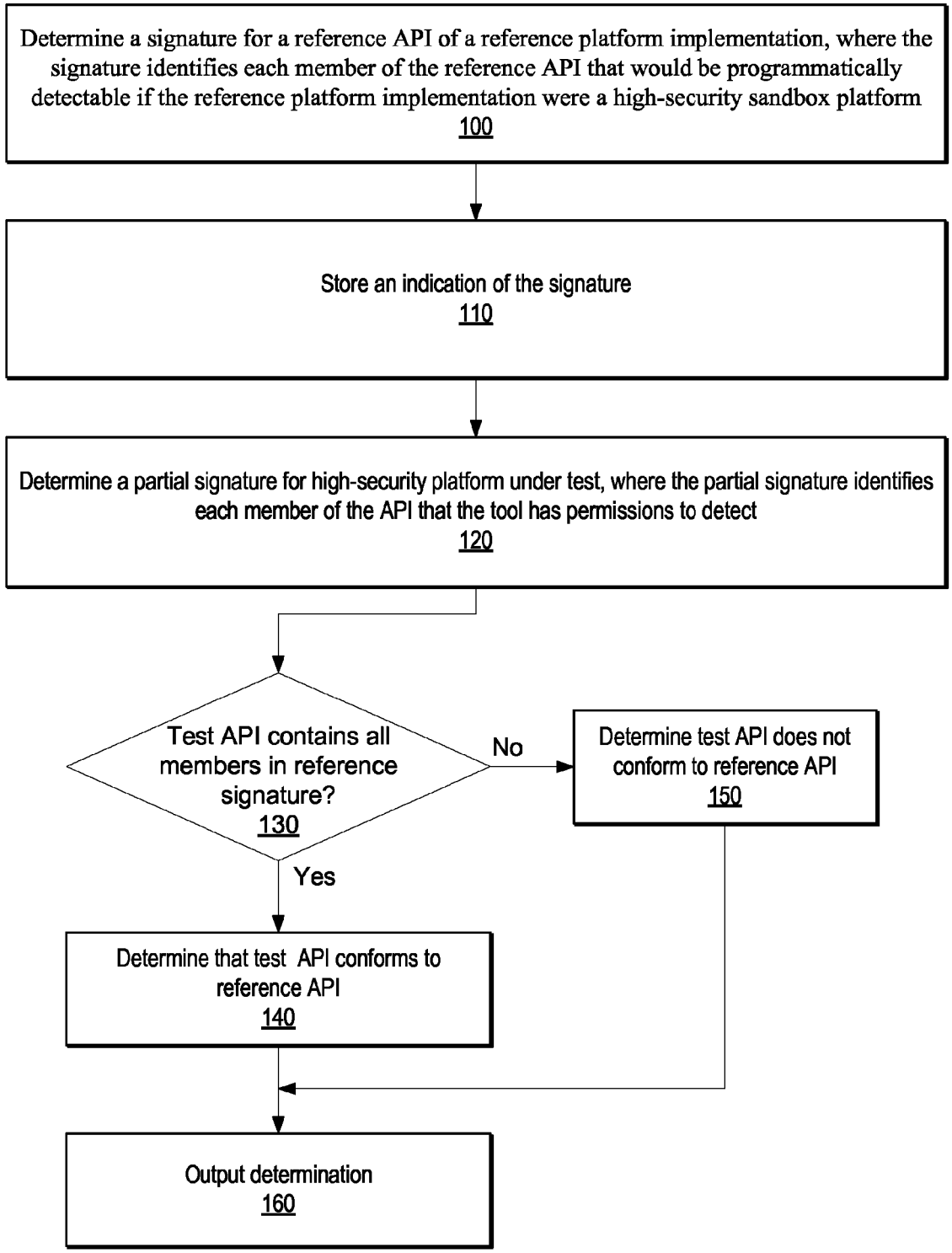
FIG. 1 is a flow diagram illustrating a method for a verifying an API of a high-security software platform, according to various embodiments.

While the invention is described herein by way of example for several embodiments and illustrative drawings, those skilled in the art will recognize that the invention is not limited to the embodiments or drawings described. It should be understood that the drawings and detailed description hereto are not intended to limit the invention to the particular form disclosed, but on the contrary, the invention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF EMBODIMENTS

Quality testing of software platforms may include verifying that an API exposed by the platform under test (test API) includes that described by a given specification and/or reference implementation (reference API). A reference API may describe a minimum API that each implementation must expose to meet a given standard. For example, for a given Java platform, such testing may include verifying that the test API includes the same set of classes as the reference API, with each class having the same set of members (e.g., fields, methods, constructors, nested classes, etc.).

For API verification of high-security platforms, various access restrictions may exist which may prevent traditional tools from fully inspecting the platform under test and thus from determining the test API. For example, the known SigTest tool, used for verifying Java-based APIs, may not have sufficient permissions to interrogate a high-security Sandbox Java™ Platform for members using the interrogation mechanisms on which it relies. For example, a SigTest verification tool may rely on methods of the Java Refection API (e.g., getDeclaredXXX( )) that require a certain level of runtime permission to be granted to the application. However, on some high-security platforms, the verification tool may have insufficient permissions to execute such methods. In one example, a BlueRay™ player built by a third party may implement an API in a high-security platform, such that the SigTest tool cannot interrogate the API. In such a case, if SigTest is used to verify whether a test API of the BlueRay player (i.e., the high-security platform) conforms to a reference API, the verification tool may abort in error, due to the tool having insufficient runtime permissions. In many cases, since the high-security platform was produced and configured by a different party than that who is executing the verification too, the party executing the verification tool may not be able to grant the tool sufficient runtime access.

According to various embodiments, API verification of a high-security platform may be performed by first determining a subset of reference API members that, if present in a test API, would be programmatically detectable by the verification utility, given its level of permissions. The subset may exclude members that would not be programmatically detectable. In some embodiments, the API verification may then include determining whether the determined subset of the reference API members is present in the test API. For example, in some embodiments, when performing an API verification of a high-security sandbox Java™ platform, a verification mechanism may determine the set of public members in the reference API and then determine whether that set of public members is present in the test API. Since the verification mechanism needs only to inspect the members of the platform under test that are public, it may have sufficient runtime permission to do so even if the platform comprises a high-security platform.

The example of performing API verification for a high-security sandbox Java platform is used throughout this disclosure and is intended to serve for illustrative purposes, and not to limit embodiments to only this case. The teachings in this disclosure may also be applied to the verification of other platforms, applications, components, and/or objects implemented using Java or various other programming languages such as C, C++, etc.

FIG. 1 depicts a high-level flowchart illustrating a method for performing API verification for a high-security sandbox platform, according to some embodiments. According to various embodiments, the illustrated method may be performed by a verification tool, such as a modified version of SigTest or by a combination of such tools, as described in greater detail below.

As illustrated in FIG. 1, during an initial setup phase, the verification tool may determine a signature for the reference API that may identify the programmatically detectable members of the reference API, as in 100. A programmatically detectable API comprises only programmatically detectable members, that is, members of the API that would be detectable by a computer program (e.g., the verification tool) when the API is of a high-security sandbox platform. As described above, members of an API may include any elements that make up the programming interface, including classes, methods, fields, constructors, nested classes, and/or other elements. Programmatically detectable members may refer to those of the members that may be detected by a software component (e.g., the verification tool) by querying the API (e.g., using reflection mechanisms) when the API is of a high-security platform.

Some test API members may not be visible to an API verification tool on the test platform due to various security policies and mechanisms employed by the high-security test platform and/or its runtime environment. For example, if the test platform comprises a high-security sandbox Java platform, then only public members of the test API (e.g., API members marked with the "public" access modifier) may be programmatically detectable by the verification tool during the test phase, while members of the test API with protected, private, or package scope may not be detectable. Therefore, if the verification tool is to be used for API verification of a high-security sandbox Java platform, then in 100, the verification tool may determine the public members of the reference API and ignore members with protected, private, and/or package scope. In other embodiments, other member scopes may be appropriate, depending on the security policy of the test platform and/or its runtime environment. As used herein, the term detectable may refer to any member of the reference API that can be detected by the verification tool while executing on the test platform. The term undetectable may refer to any member of the reference API that cannot be detected by the verification tool while executing on the test platform, such as those for which the verification tool does not have sufficient runtime permissions to interrogate the platform under test.

According to the illustrated embodiment, once the signature (including the programmatically detectable members) of the reference API is determined (i.e., initial setup of 100), the verification tool may store an indication of the signature (as in 110), such as in a signature file.

In some embodiments, the verification tool or another tool may then be used to execute a test phase, wherein the tool may execute on the high-security platform under test. In this test phase, the tool may detect the members of the test API for the platform that the tool has sufficient permission to detect, as in 120. Once the detectable reference API is determined (as in 100) and the detectable members of the test API are determined (as in 120), the two sets of members may be compared as in 130. If the test API contains all the members of the detectable reference API, as indicated by the affirmative exit from 130, then the tool may determine that the test API implements (i.e., conforms to) the reference API, as in 140. Conversely, if the tool has detected that any member of the reference API does not exist in the test API, as indicated by the negative exit from 130, then the tool may determine that the test API does not implement (i.e., does not conform to) the reference API, as in 150. In either case, the verification tool may output its determination, as in 160, and/or store the result (e.g., in system memory, disk, etc.). In various embodiments, the output may comprise any indication to a user of the determination of 140 or 150. In some embodiments, if the verification tool determines that the test API does not implement the reference API, the output may include further analysis regarding which API member or members are missing from the test API.

Figure 2:
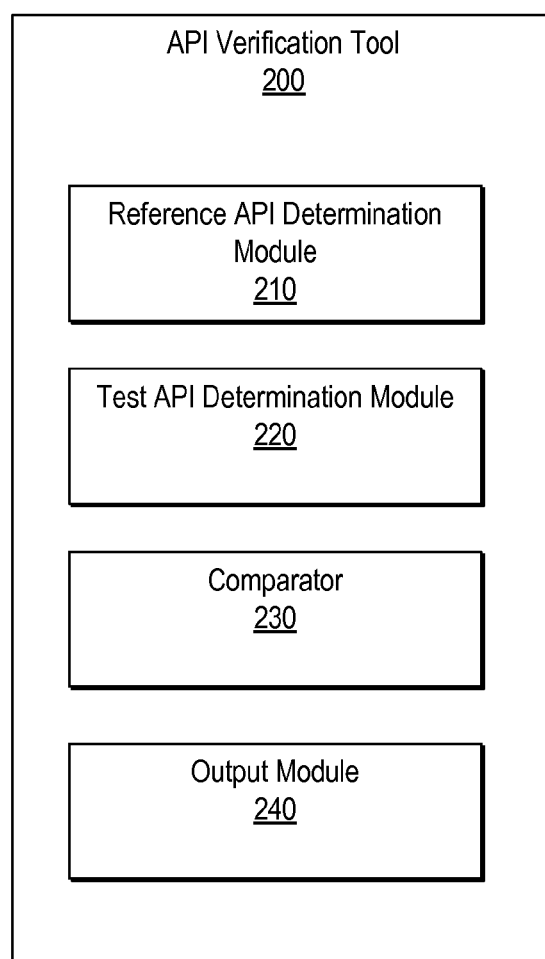
FIG. 2 is a block diagram illustrating the components of an API verification tool configured to verify an API of a high-security software platform, according to some embodiments.

FIG. 2 is a block diagram illustrating an API verification tool and its components, according to one embodiment. The API verification tool may be used to verify the compliance of a test API with a reference API according to various embodiments, such as by executing the method of FIG. 1, or similar method. API verification tool 200 may comprise any number of software and/or hardware components, which may include those illustrated in FIG. 2. In other embodiments, additional or fewer components may be included and/or the functionality of various components may be combined. For example, in some embodiments, API verification tool 200 may be implemented as two different components, one for performing the setup phase (e.g., 100 of FIG. 1) and another for performing the test phase (e.g., 110-150 of FIG. 1).

According to the embodiment of FIG. 2, API verification tool 200 may comprise a reference API determination module, such as 210. In various embodiments, determination module 210 may be configured to scan a reference platform implementation and determine any detectable API members of the reference platform's API. For example, reference API determination module 210 may be configured to scan a reference Java platform implementation to determine the public members of the API, while not recording members with different scopes of visibility (e.g., private, protected, package, etc.).

In various embodiments, reference API determination module 210 may be configured to output the results of each scan in various formats. For example, in some embodiments, determination module 210 may output the detectable members of the reference API as a plain-text file, which may be human readable. In one such example, the plain-text file may be in a format used by one or more other API verification applications, such as the "Golden Signature File" format used in the SigTest tool or in another format. In some embodiments, determination module 210 may output the reference API as one or more serialized Java objects. In yet other embodiments, the output of determination module 210 may not be written to file at all, but rather remain in memory and passed to other components as an in memory object or objects.

In the illustrated embodiment of FIG. 2, API verification tool 200 may further include test API determination module 220. In various embodiments, determination module 220 may be configured to scan a high-security test platform and detect one or more API members of the platform. In some embodiments, test API determination module 220 may be configured to detect test API members using only mechanisms for which the verification tool has sufficient permissions to execute. For example, in one embodiment, if a high-security sandbox Java platform is to be verified, the tool may avoid using forbidden Reflection API methods (e.g., getDeclaredMethod( ), etc.) for which it has insufficient permissions to execute. Rather, in such an embodiment, the verification tool may instead use methods for which it has permissions, such as those that return only public API members (e.g., getClasses( ), getConstructors( ), getFields( ), getMethods( ), etc.). As with the reference API determination module 210, test API determination module 220 may output the test API according in formats.

According to the embodiment of FIG. 2, API verification tool 200 may include comparator 230, which may be used to compare the outputs from reference API determination module 210 and test API determination module 220, and output module 240 for recording this determination and/or otherwise informing a user about the results of the API verification test, as in 150. In some embodiments, comparator 230 may perform the determination of 120, as shown in FIG. 1. In various embodiments, comparator 230 may accept as input the output from determination modules 210 and 220. In some embodiments, the output of determination modules 210 and 220 may be manipulated by one or more other components into various formats before the final format is input to comparator 230. For example, in some embodiments, the output from an API determination module such as 210 may be a serialized object, which may be deserialized by another component before being input to comparator 230 as an in-memory object. In some cases, this may be useful for cross-compatibility between test and reference APIs implemented with different versions of a technology, such as different versions of Java.

Figure 3:
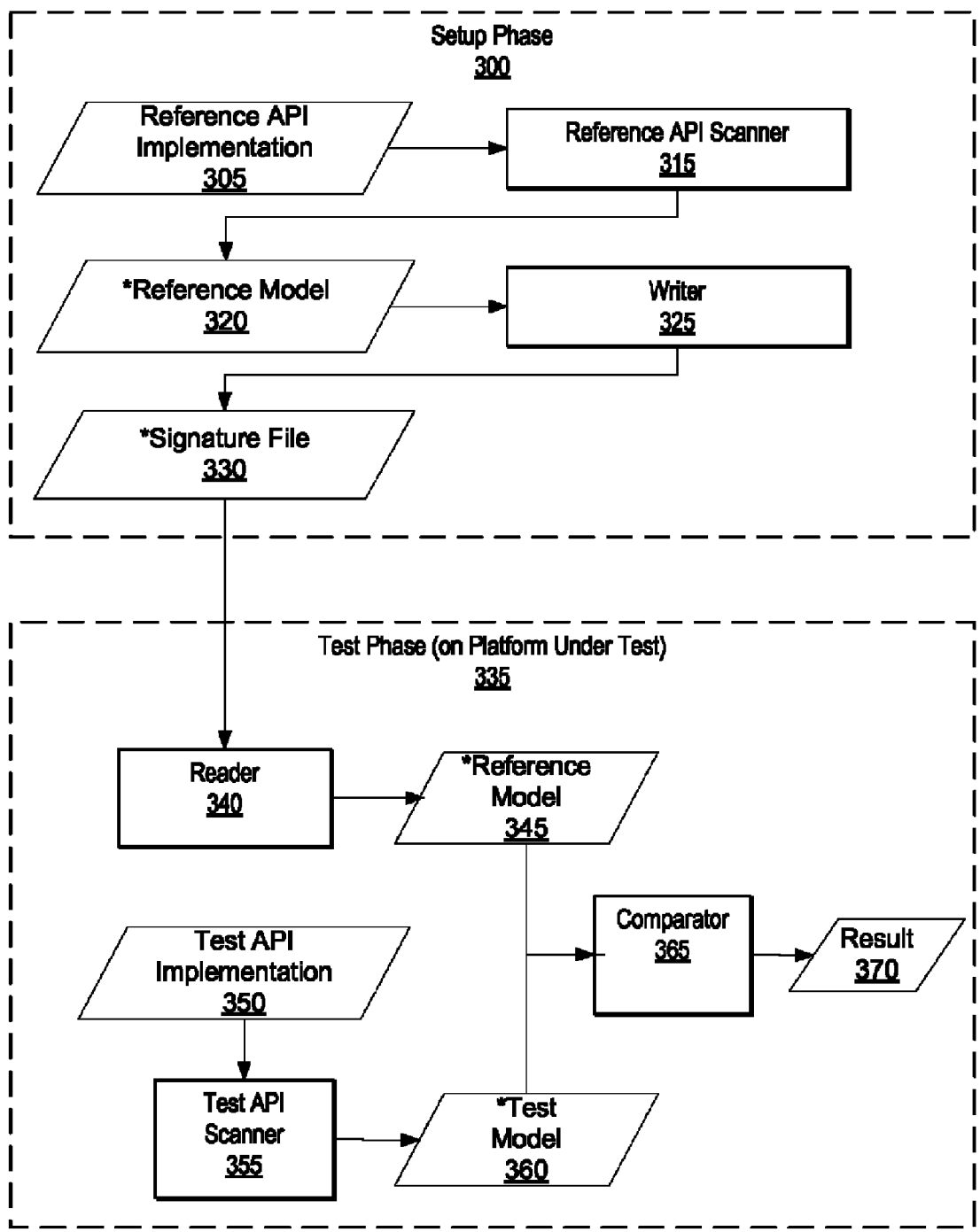
FIG. 3 illustrates the components, workflow, and data products of a system and method for verifying an API of a high-security software platform, according to some embodiments.

FIG. 3 illustrates a set of components and data workflow of a verification utility configured to perform API verification in accordance various embodiments described herein. The embodiment of FIG. 3 is shown as comprising at least two phases. The first is an initial setup phase 300 in which a detectable reference API is determined (as in 100). The second is a test phase wherein the verification tool may be executed on the platform under test to determine a test API and to determine whether that test API implements the detectable reference API (as in 110-150). In various embodiments, setup phase 300 and test phase 335 may be executed by different tools (e.g., a setup-side verification tool and a test-side verification tool) or the same tool (e.g., API verification tool 200).

According to the illustrated embodiment, the setup phase 300 may begin by examining a reference platform API implementation, such as 305. The reference API implementation may implement the minimum functionality (i.e., members) that a platform implementation may implement to be considered complete for interoperating with applications built for the platform.

According to the illustrated embodiment, a reference API scanner 315 may interrogate the reference API implementation 305 to derive a reference model 320 of reference API members that would be detectable from a high-security platform. In elements of FIGS. 3 and 4, the * symbol is used to denote elements that exclude undetectable members of the reference API for the platform under test. In various embodiments, the reference API scanner 315 may use various methods for interrogating the reference API 305. For example, if the reference implementation comprises a Java platform, reference API scanner 315 may use Java Reflection functionality to discover the classes, method, member variables, and/or other members of the reference implementation.

In some embodiments, the reference API scanner may filter out API members that would not be visible to the verification tool during the test phase, as described earlier. For instance, if reference implementation 305 comprises a Java platform, reference API scanner 315 may include in detectable reference model only API members that are designated as public in the API and exclude API members designated with protected, private, or default access scopes. In various embodiments, detectable reference model may be implemented as an in-memory object and/or as a file.

According to the illustrated embodiment of FIG. 3, once reference model 320 is derived, the model may be passed as input to a writer component 325, which may convert the reference model of detectable API members into a signature file 330 (sometimes known as a "golden" signature file). In various embodiments, the signature file may be a plain text and/or human-readable file that may describe the detectable API members included in reference model 320.

According to the embodiment of FIG. 3, the resulting data product of setup phase 300 is signature file 330, which summarizes the detectable members of reference implementation 305. In various embodiments, signature file 330 may then be distributed to one or more parties for testing different platforms. For example, the author of a reference implementation may execute setup phase 300 to produce a signature file (such as 330) and distribute that file to various parties that wish to verify the API of different implementations of the platform.

A party that receives the signature file 330 may use it to verify a platform under test, such as by executing test phase 335. In some embodiments, test phase 335 may be executed by a test-side verification tool executing on the test platform. In different embodiments, the test-side verification tool may be a different or the same tool as the setup-side verification tool used to execute setup phase 300. In some embodiments, the test platform may comprise a high-security platform. Therefore, the verification tool executing on the test platform may not have full permission to interrogate the test platform for all of its API members.

According to the illustrated embodiment, test phase 335 may begin when a signature file reader (e.g., 340) reads an input signature file (e.g., 330) and converts it into a reference model, such as 345, which is readable by comparator 365. Reference model 345 may comprise a representation of the reference API members identified in signature file 330, but in a format readable by comparator 365. For example, in some embodiments, reference model 345 may comprise an in-memory object usable by comparator 365. In other various embodiments, reference model 345 may be in any format that is readable by comparator 365, including the format of the original signature file. Thus, reference model 345 may comprise a representation of the detectable members of reference API 305 in a format that is readable by comparator 365.

In addition to converting signature file 330 to reference model 345, test phase 335 may also include the verification tool deriving a similar model for the test API. For example, the verification tool may utilize a test API scanner (e.g., 355) to scan the detectable API members of the platform under test (e.g., test API implementation 350).

Recall that since the test platform may comprise a high-security platform, components of the verification tool (e.g., test API scanner 355) may have insufficient permissions for scanning some members of test API implementation 350. Therefore, in some embodiments, test API scanner 355 may scan only the API members of test API 350 for which scanner 355 has permissions (e.g., the detectable members of test API 350). For example, if the platform under test comprises a high-security sandbox Java platform, the verification tool (including test API scanner 355) may be run in user mode and thus have insufficient permissions for interrogating private, protected, or package level API members. Therefore, in such an embodiment, test API scanner 355 may be configured to only scan test API 350 for public API members (i.e., members identified with the "public" access modifier). In some embodiments, this may be accomplished by invoking one or more methods of the Java Reflection API for which the verification tool has runtime permissions (e.g., getClasses( ), getConstructors( ), getFields( ), getMethods( ), etc.)

According to the illustrated embodiment of FIG. 3, test API scanner 355 may produce a test model 360 that indicates the detectable API members of test API 350. In some embodiments, test model 260 may be in the same format as reference model 345. For example, reference model 345 and test model 360 may both be in-memory objects, such as two different instances of the same data type. Thus, according to various embodiments, reference model 345 may comprise an indication of only the detectable members of reference API implementation 305 while test model 360 may comprise an indication of only the detectable members of test API implementation 350.

According to the illustrated embodiment, comparator 365 may compare reference model 345 and test model 360 to determine whether test model 360 includes all of the API members of reference model 345. If the test model does include all of the API members of reference model 345, then comparator 365 may determine that test API implementation 350 implements reference API 305. Otherwise, if comparator 365 detects that one or more members of reference model 345 are not present in test model 360, it may determine that test API 350 does not implement reference API 305.

Comparator 365 may output the result of its analysis, as in 370. Result 370 may include recording the API comparison results to memory and/or any other computer-readable storage medium (e.g., magnetic disk). In some embodiments, result 370 may comprise displaying an indication of the result on a computer display. In some embodiments, an indication of the result may be recorded and/or communicated to a user using various other mechanisms.

In some embodiments, a verification tool (e.g., 200 in FIG. 2) may be built to include some components from other verification tools, such as the SigTest verification utility. In some cases, such component reuse may allow for faster development of different components of the verification tool. For example, the SigTest API verification tool is traditionally executed using a setup phase in which a "golden signature file" is produced and a subsequent test phase on the test platform, in which the test API is interrogated and compared to the reference API described by the golden signature file. These phases may be analogous in purpose to setup and test phases 300 and 335 of FIG. 3. In various embodiments, the setup phase of the SigTest utility may be extended to be used in the API verification of high-security sandbox Java platforms, according to various embodiments.

Figure 4:
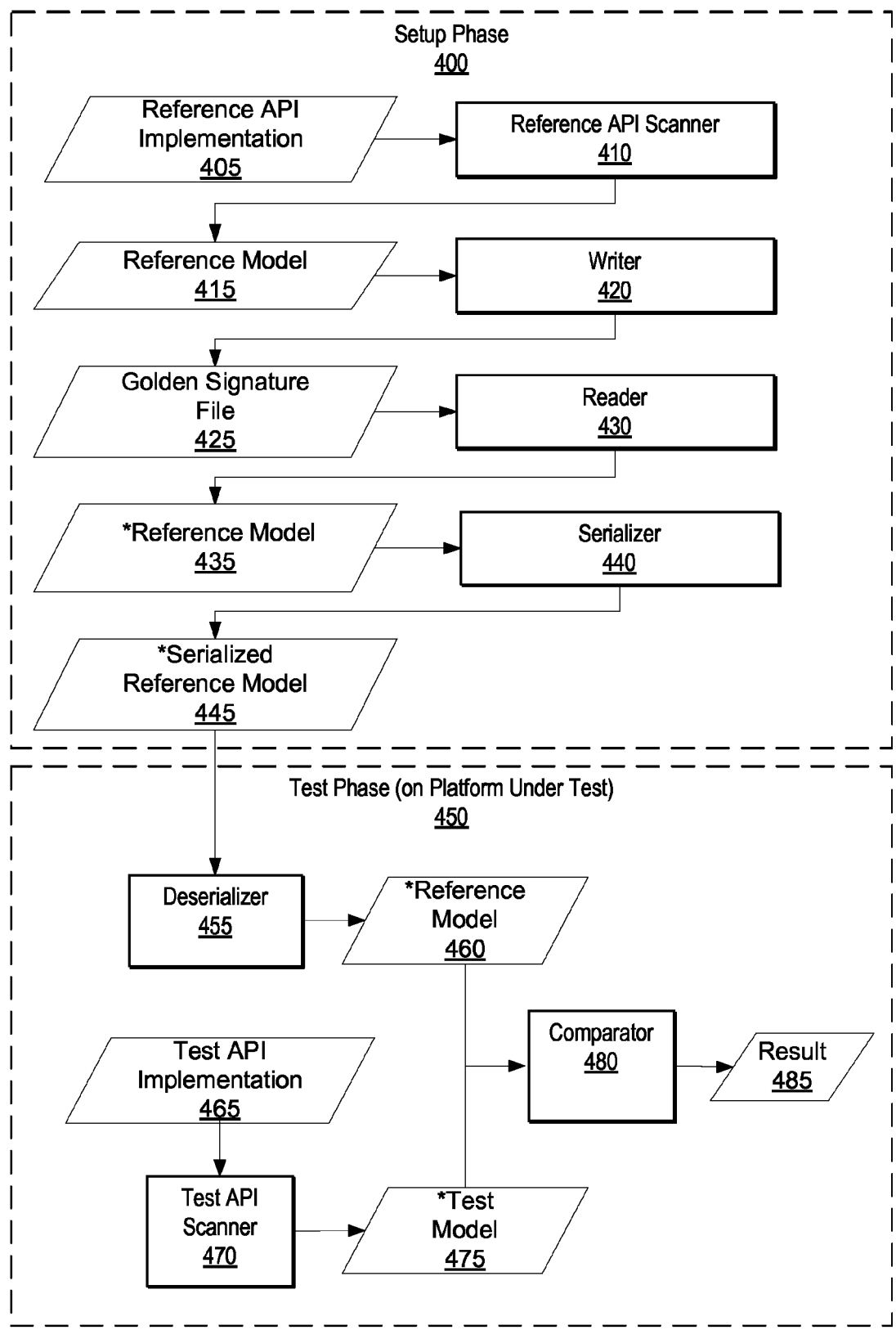
FIG. 4 illustrates the components, workflow, and data products of a system and method for verifying an API of a high-security software platform through extending traditional SigTest components, according to some embodiments.

FIG. 4 illustrates the components, data products, and workflow of an API verification tool, such as 200, configured to utilize components of other verification tools, such as SigTest. According to the embodiment of FIG. 4, setup phase 400 may comprise a reference API scanner 410 interrogating a reference API implementation, such as 405. Through such interrogation, reference API scanner 410 may produce a reference model 415, which may describe the API members of the reference implementation. Reference model 415 may comprise an in-memory data structure/object, which may subsequently be converted to a signature file, such as 425, by a writer component, such as 420.

According to the illustrated embodiment, elements 405-425 in FIG. 4 may be components borrowed from and/or analogous to those of the original SigTest application. Components 405-425 may be analogous in purpose to elements 305-330 of FIG. 3, but since components 405-425 may be borrowed from the SigTest application, unlike 305-330, in the embodiment of FIG. 4, member filtering is not performed based on the ability to detect an API member on the platform under test. For example, in some embodiments, reference API scanner 410 may be configured to scan for all API members of the reference API implementation 405, as is done in the traditional SigTest tool. Therefore, reference model 415 and the resulting golden signature file 425 may contain both detectable and undetectable members of reference API 405. As described above, in some embodiments, elements 405-425 may be elements of the traditional SigTest tool.

According to the illustrated embodiment, the traditional SigTest setup phase of 405-425 may be extended for API verification of high-security sandbox Java platforms, as shown in FIG. 4. According to the illustrated embodiment, the verification tool may include a reader component 430, which may convert the golden signature file 425 into a reference model, such as 435. In some embodiments, reference model 435 may comprise an in-memory data structure or object.

According to the illustrated embodiment, reference model 435 may comprise only members of the reference API that are detectable from a high-security test platform, such as the test platform. In some embodiments, reader 430 may be configured to filter out the API members in golden signature file 425 that would not be detectable by an API verification utility on the test platform. For example, if the platform under test were a high-security sandbox Java platform, as discussed earlier, reader 430 may be configured to include only public members of reference API 405 in reference model 435. As in FIG. 3, the * symbol is used to denote elements of FIG. 4 that exclude undetectable members of the reference API.

One difficulty with the traditional SigTest workflow, wherein a golden signature file, such as 425, is used as input to the test phase, is that a reader component for reading the golden signature file (such as 340 in FIG. 3) may require special libraries. For example, a reader component may require various text parsing and/or regular expression utilities that may only be available on a given platform, such as Java 1.5. If such utilities are not available on the test platform, this may cause the SigTest test phase to fail. However, such platforms may still be tested using the embodiment of FIG. 4, since, in the pictured embodiment, the reader component 430 is executed during the setup phase, which may be on a platform other than the test platform. Thus, even in the case where the test platform does not provide the required utilities for parsing the golden signature file 425, test phase 450 may still be executed successfully.

According to the illustrate embodiment, reference model 435 may be serialized by serializer component 440 into a flat file, such as serialized reference model 445. In different embodiments, various serialization mechanisms may be used for converting reference model 435 to serialized reference model 445, including standard Java Serialization API. Serialized reference model 445 may comprise a plain text file and/or may be usable by a deserializer component to reconstitute an in-memory instance of reference model 435.

As with signature file 330 of FIG. 3, serialized reference model 445 may be distributed to one or more parties for testing different platform implementations. For example, the author of a reference implementation may execute setup phase 400 to produce a serialized reference model (such as 445) and distribute that model to various parties that may use it in verifying the API of different implementations of the platform by executing a test phase, such as 450 on a platform under test.

According to the illustrated embodiment, a test API implementation (e.g., 465) of a platform under test may be verified against a reference API implementation (e.g., 405) by executing a test phase such as 450 on the platform under test with a serialized reference model (e.g., 445) as input. According to the illustrated embodiment, a test API scanner 470 may scan the test API implementation 465 to detect API members and create test model 475, which is indicative of the detectable members of test API 465. The scanning of test API 465 may be analogous to the scanning of test API 350 by scanner 355 in FIG. 3.

According to the illustrated embodiment, serialized reference model 445 may be given as input to deserializer component 455, which may use serialized reference model 445 to reconstitute an in-memory reference model (e.g., 460) of the detectable reference API members. Reference model 460 may then be compared to test model 475 by a comparator component 480 and the result recorded and/or displayed, as in 485. In various embodiments, the model comparison and output phases of 460, 475, 480, and 485 may be analogous those of FIG. 3 (345, 360, 365, and 370) and any variations described in regard to the embodiment of FIG. 3 may apply also to those of FIG. 4.

Figure 5:
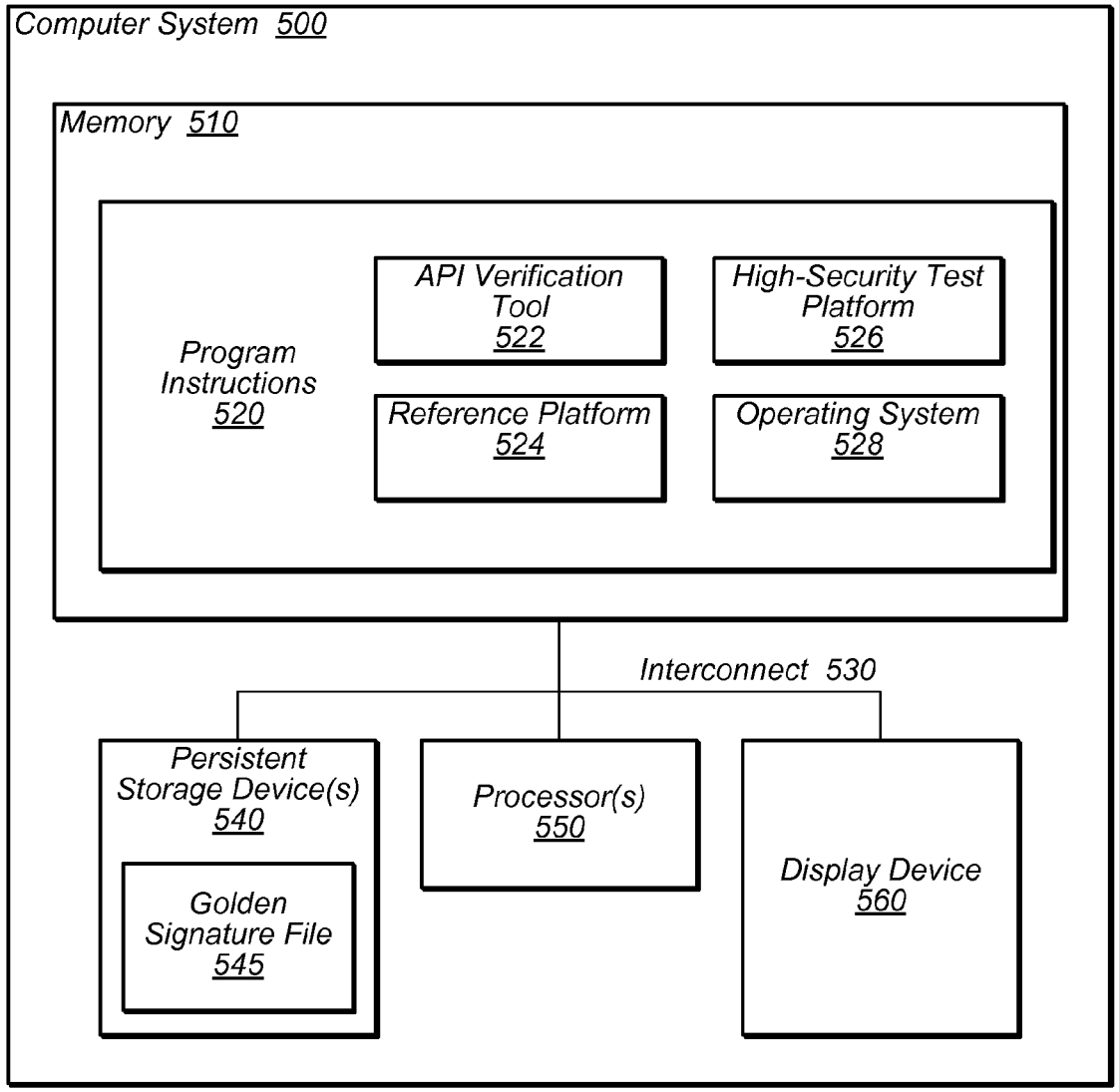
FIG. 5 is a block diagram illustrating a computer system configured to verify an API of a high-security software platform, according to some embodiments.

FIG. 5 illustrates one embodiment of a computer system configured to implement an API verification tool for verifying high-security platforms, as described herein. Computer system 500 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device. It is noted that computer system 500 may be used to execute the setup and/or test phase of the API verification techniques described herein.

Computer system 500 may include one or more processors 550, each of which may include multiple cores, any of which may be single or multi-threaded. The computer system 500 may also include one or more persistent storage devices 540 (e.g. optical storage, magnetic storage, hard drive, tape drive, solid state memory, etc), which may store one or more of the data products produced for API verification, such as golden signature file 545. Computer system 500 may include one or more memories 510 (e.g., one or more of cache, SRAM, DRAM, RDRAM, EDO RAM, DDR 10 RAM, SDRAM, Rambus RAM, EEPROM, etc.). Computer system 500 may include one or more display devices 560 for providing a user interface and/or reporting results for API verification tests, as described herein. Various embodiments may include fewer or additional components not illustrated in FIG. 5 (e.g., video cards, audio cards, network interfaces, peripheral devices, a network interface such as an ATM interface, an Ethernet interface, a Frame Relay interface, etc.)

The one or more processors 550, storage device(s) 540, network interface 550 and system memories 510 may be coupled to system interconnect 530. One or more of the system memories 510 may contain program instructions 520. Program instructions 520 may be encoded in platform native binary, any interpreted language such as Java™ byte-code, or in any other language such as C/C++, Java™, etc or in any combination thereof.

Program instructions 520 may include program instructions executable to implement one or more API verification tools and/or components 522 for performing API verification of high-security platforms, as described herein. In some embodiments, API verification tool 522 may be implemented as an application or utility for implementing the setup and/or test phases of the API verification process, as described herein. The API verification tool 522 may contain various components no pictured in FIG. 5, such as API scanners, readers, serializers, deserializers, comparators, output modules, etc., as described herein.

According to the illustrated embodiment, memory 510 may also comprise program instructions executable to implement a reference platform implementation 524 and/or a high-security test platform 526. In some embodiments, the computer system would contain only reference platform 524 or only high-security test platform 526. Program instructions 520 may also include one or more operating systems 528, such as Windows™, Solaris™, Linux, etc.

The API verification systems as described herein may be provided as a computer program product, or software, that may include a computer-readable storage medium having stored thereon instructions, which may be used to program a computer system (or other electronic devices) to perform a process according to various embodiments. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

Although the embodiments above have been described in considerable detail, numerous variations and modifications will become apparent to those skilled in the art once the above disclosure is fully appreciated. It is intended that the following claims be interpreted to embrace all such variations and modifications.

What is claimed:

1. A computer-implemented method, comprising:
performing, by a computer:
determining a signature for a reference application programming interface (API) of a reference software platform implementation, wherein the reference API includes a plurality of members, and said determining the signature comprises:
identifying a proper subset of the plurality of members, wherein said identifying comprises excluding at least one of the plurality of members whose presence in a particular implementation of the reference API on a high-security platform is not programmatically detectable by a given verification tool executing on the high-security platform, wherein the given verification tool is not granted a sufficient level of runtime permissions by the high-security platform to enable the given verification tool to programmatically detect the presence of the at least one member in the particular implementation; and
configuring the signature to indicate the members of the proper subset and not to indicate the at least one excluded member; and
storing the signature.

2. The computer-implemented method of claim 1, further comprising:
executing the API verification tool on a high-security platform implementing a test API comprising a plurality of test API members, wherein the API verification tool has insufficient permissions to programmatically detect at least one of the plurality of test API members, said executing comprising:
scanning the test API to determine a subset of the plurality of test API members, the subset excluding any of the test API members that the API verification tool has insufficient permissions to programmatically detect;
determining a signature for the test API, the signature identifying the test API members in the subset of test API members and excluding any test API members not in the subset of test API members; and
verifying whether the subset of test API members contains the members of the proper subset of reference API members;
storing a result of said verifying.

3. The computer-implemented method of claim 2, wherein the signature for the reference API is recorded in a signature file and wherein said verifying is dependent, at least in part, on the signature file.

4. The computer-implemented method of claim 3, wherein the signature file comprises a serialized representation of an in-memory data structure indicative of the members of the proper subset of reference API members, and wherein the serialized representation is usable by the API verification tool to reconstruct the data structure in memory.

5. The computer-implemented method of claim 2, wherein the high-security software platform implementing the test API comprises a high-security sandbox Java platform.

6. The computer-implemented method of claim 2, wherein said determining a signature for the reference API is performed on a different system than is said executing the API verification tool.

7. The computer-implemented method of claim 2, further comprising:
determining that the subset of test API members does not contain at least one member of the proper subset of the reference API members; and
in response to said determining that the subset of test API members does not contain at least one member of the proper subset of the reference API members, storing an indication of the at least one member of the proper subset of the reference API.

8. A non-transitory computer-readable storage medium storing program instructions executable by a processor in a multi-threaded, transactional memory system to implement:
determining a signature for a reference application programming interface (API) of a reference software platform implementation, wherein the reference API includes a plurality of members, and said determining the signature comprises:
identifying a proper subset of the plurality of members, wherein said identifying comprises excluding at least one of the plurality of members whose presence in a particular implementation of the reference API on a high-security platform is not programmatically detectable by a given verification tool executing on the high-security platform, wherein the given verification tool is not granted a sufficient level of runtime permissions by the high-security platform to enable the given verification tool to programmatically detect the presence of the at least one member in the particular implementation; and
configuring the signature to indicate the members of the proper subset and not to indicate the at least one excluded member; and
storing the signature.

9. The computer-readable storage medium of claim 8, wherein the program instructions are further executable by the processor to implement:
executing the API verification tool on a high-security platform implementing a test API comprising a plurality of test API members, wherein the API verification tool has insufficient permissions to programmatically detect at least one of the plurality of test API members, said executing comprising:
scanning the test API to determine a subset of the plurality of test API members, the subset excluding any of the test API members that the API verification tool has insufficient permissions to programmatically detect;

determining a signature for the test API, the signature identifying the test API members in the subset of test API members and excluding any test API members not in the subset of test API members; and verifying whether the subset of test API members contains the members of the proper subset of reference API members;

storing a result of said verifying.

10. The computer-readable storage medium of claim 9, wherein the signature for the reference API is recorded in a signature file and wherein said verifying is dependent, at least in part, on the signature file.

11. The computer-readable storage medium of claim 10, wherein the signature file comprises a serialized representation of an in-memory data structure indicative of the members of the proper subset of reference API members, and wherein the serialized representation is usable by the API verification tool to reconstruct the data structure in memory.

12. The computer-readable storage medium of claim 9, wherein the high-security software platform implementing the test API comprises a high-security sandbox Java platform.

13. The computer-readable storage medium of claim 9, wherein said determining a signature for the reference API is performed on a different system than is said executing the API verification tool.

14. The computer-readable storage medium of claim 9, wherein the program instructions are further executable by the processor to implement:

determining that the subset of test API members does not contain at least one member of the proper subset of the reference API members; and in response to said determining that the subset of test API members does not contain at least one member of the proper subset of the reference API members, storing an indication of the at least one member of the proper subset of the reference API.

15. A system, comprising:

one or more processors;

a memory coupled to the one or more processors and storing program instructions executable by the one or more processors to implement:

determining a signature for a reference application programming interface (API) of a reference software platform implementation, wherein the reference API includes a plurality of members, and said determining the signature comprises:

identifying a proper subset of the plurality of members, wherein said identifying comprises excluding at least one of the plurality of members whose presence in a particular implementation of the reference API on a high-security platform is not programmatically detectable by a given verification tool executing on the high-security platform, wherein the given verification tool is not granted a sufficient level of runtime permissions by the high-security platform to enable the given verification tool to programmatically detect the presence of the at least one member in the particular implementation; and configuring the signature to indicate the members of the proper subset and not to indicate the at least one excluded member; and storing the signature.

16. The system of claim 15, wherein the program instructions are further executable by the processor to implement:

executing the API verification tool on a high-security platform implementing a test API comprising a plurality of test API members, wherein the API verification tool has insufficient permissions to programmatically detect at least one of the plurality of test API members, said executing comprising:

scanning the test API to determine a subset of the plurality of test API members, the subset excluding any of the test API members that the API verification tool has insufficient permissions to programmatically detect;

determining a signature for the test API, the signature identifying the test API members in the subset of test API members and excluding any test API members not in the subset of test API members; and verifying whether the subset of test API members contains the members of the proper subset of reference API members;

storing a result of said verifying.

17. The system of claim 16, wherein the signature for the reference API is recorded in a signature file and wherein said verifying is dependent, at least in part, on the signature file.

18. The system of claim 17, wherein the signature file comprises a serialized representation of an in-memory data structure indicative of the members of the proper subset of reference API members, and wherein the serialized representation is usable by the API verification tool to reconstruct the data structure in memory.

19. The system of claim 16, wherein the high-security software platform implementing the test API comprises a high-security sandbox Java platform.

20. The system of claim 16, wherein the program instructions are further executable to implement:

determining that the subset of test API members does not contain at least one member of the proper subset of the reference API members; and in response to said determining that the subset of test API members does not contain at least one member of the proper subset of the reference API members, storing an indication of the at least one member of the proper subset of the reference API.

* * * * *